(12) United States Patent
Schoonover

(10) Patent No.: US 7,089,086 B2
(45) Date of Patent: Aug. 8, 2006

(54) METHOD, SYSTEM AND STORAGE MEDIUM FOR PERFORMING ONLINE VALVE DIAGNOSTICS

(75) Inventor: Larry Schoonover, North Attleboro, MA (US)

(73) Assignee: Dresser, Inc., Addison, TX (US)

( * ) Notice: Subject to any disclaimer, the term of this patent is extended or adjusted under 35 U.S.C. 154(b) by 34 days.

(21) Appl. No.: 10/777,437

(22) Filed: Feb. 12, 2004

(65) Prior Publication Data

US 2004/0228173 A1 Nov. 18, 2004

Related U.S. Application Data

(60) Provisional application No. 60/447,598, filed on Feb. 14, 2003.

(51) Int. Cl.
*G06F 19/00* (2006.01)

(52) U.S. Cl. .................. 700/275; 700/282; 251/129.01

(58) Field of Classification Search ................ 700/275, 700/282; 251/129.01
See application file for complete search history.

(56) References Cited

U.S. PATENT DOCUMENTS

| | | | |
|---|---|---|---|
| 4,029,122 A | 6/1977 | Jaegtnes | |
| 4,263,997 A | 4/1981 | Poore | |
| 4,274,438 A | 6/1981 | La Coste | |
| 4,481,451 A | 11/1984 | Kautz et al. | |
| 4,509,403 A | 4/1985 | Gassman et al. | |
| 4,523,286 A | 6/1985 | Koga et al. | |
| 4,542,649 A | 9/1985 | Charbonneau et al. | |
| 4,556,956 A | 12/1985 | Dickenson et al. | |
| 4,690,003 A | 9/1987 | McNennamy et al. | |
| 4,693,113 A | 9/1987 | McNennamy et al. | |
| 4,712,173 A | 12/1987 | Fujiwara et al. | |
| 4,831,873 A | 5/1989 | Charbonneau et al. | |
| 4,856,327 A | 8/1989 | Branam et al. | |
| 4,860,596 A | 8/1989 | Charbonneau et al. | |
| 4,896,101 A | 1/1990 | Cobb | ........................ 324/73.1 |
| 4,976,144 A | 12/1990 | Fitzgerald | |
| 5,049,764 A | 9/1991 | Meyer | |
| 5,070,846 A | 12/1991 | Dudek et al. | |
| 5,109,692 A | 5/1992 | Fitzgerald | |
| 5,197,328 A | 3/1993 | Fitzgerald | |
| 5,249,954 A | 10/1993 | Allen et al. | |
| 5,251,148 A | 10/1993 | Haines et al. | |
| 5,272,647 A | 12/1993 | Hayes | |

(Continued)

FOREIGN PATENT DOCUMENTS

DE 39 11 259 A1 10/1990

(Continued)

OTHER PUBLICATIONS

"Non-Invasive Diagnostics of Motor-Operated Valves" - Jangobom Chai, Ajou University. Proceedings of the American Control Conference, Jun. 1994. pp. 2006-2012.*

(Continued)

*Primary Examiner*—Leo Picard
*Assistant Examiner*—Michael D. Masinick
(74) *Attorney, Agent, or Firm*—Fish & Richardson P.C.

(57) ABSTRACT

Methods and systems for performing online valve diagnostics. Valve characteristics such as step response, friction and spring range are determined while the valve is operating in a process without intervention by a controller deriving the valve diagnostics. Valve information is obtained while the valve operates in response to a control signal controlling a process while the valve operates through a series of gradual movements. Valve characteristics are then determined from the valve information.

13 Claims, 7 Drawing Sheets

U.S. PATENT DOCUMENTS

| | | | |
|---|---|---|---|
| 5,329,465 A | 7/1994 | Arcella et al. | |
| 5,425,270 A | 6/1995 | McDonald et al. | 73/168 |
| 5,431,182 A | 7/1995 | Brown | |
| 5,469,737 A | 11/1995 | Smith et al. | |
| 5,524,484 A | 6/1996 | Sullivan | |
| 5,526,690 A | 6/1996 | Louie et al. | |
| 5,533,544 A | 7/1996 | Good et al. | |
| 5,543,696 A | 8/1996 | Huggett et al. | |
| 5,549,137 A | 8/1996 | Lenz et al. | |
| 5,573,032 A | 11/1996 | Lenz et al. | |
| 5,594,175 A | 1/1997 | Lyon et al. | 73/593 |
| 5,616,824 A | 4/1997 | Abdel-Malek et al. | 73/1.01 |
| 5,654,885 A | 8/1997 | Mayhew et al. | |
| 5,684,451 A | 11/1997 | Seberger et al. | |
| 5,687,098 A | 11/1997 | Grumstrup et al. | 364/551.01 |
| 5,715,178 A | 2/1998 | Scarola et al. | 364/551 |
| 5,847,952 A * | 12/1998 | Samad | 700/48 |
| 5,878,765 A | 3/1999 | Lange | |
| 5,884,894 A | 3/1999 | Smith | |
| 5,892,690 A | 4/1999 | Boatman et al. | |
| 5,966,679 A | 10/1999 | Snowbarger et al. | 702/105 |
| 5,970,430 A | 10/1999 | Burns et al. | |
| 5,992,229 A | 11/1999 | Pyotsia et al. | 73/168 |
| 6,016,875 A | 1/2000 | Orbach et al. | |
| 6,035,878 A | 3/2000 | Adams et al. | |
| 6,102,321 A | 8/2000 | Clary | 364/551.01 |
| 6,155,283 A | 12/2000 | Hansen et al. | |
| 6,192,321 B1 | 2/2001 | Grumstrup et al. | |
| 6,272,401 B1 * | 8/2001 | Boger et al. | 700/282 |
| 6,453,261 B1 * | 9/2002 | Boger et al. | 702/138 |
| 6,466,893 B1 | 10/2002 | Latwesen et al. | |
| 6,505,145 B1 | 1/2003 | Bjornson | 702/185 |
| 6,678,584 B1 | 1/2004 | Junk et al. | |
| 6,745,084 B1 * | 6/2004 | Boger et al. | 700/13 |
| 2001/0032518 A1 * | 10/2001 | Boger et al. | 73/861 |
| 2001/0037159 A1 * | 11/2001 | Boger et al. | 700/52 |
| 2001/0037670 A1 * | 11/2001 | Boger et al. | 73/1.72 |
| 2002/0052712 A1 | 5/2002 | Voser et al. | 702/182 |
| 2003/0144747 A1 * | 7/2003 | Shakespeare | 700/28 |

FOREIGN PATENT DOCUMENTS

| | | |
|---|---|---|
| DE | 095 40 441 A1 | 4/1997 |
| EP | 0 571 080 A | 11/1993 |
| EP | 0 660 017 A | 6/1995 |
| JP | 08018329 | 1/1996 |
| JP | 09189370 | 7/1997 |
| JP | 10-336238 | 12/1998 |
| WO | WO 01/11436 A1 | 2/2001 |

OTHER PUBLICATIONS

Fisher Bulletin 62.1:VL1000: DVC5000, DVC5000(S1); DT4000; Jun. 1994, pp. 1-26.
Fisher Bulletin 62.1:DT4000(S1); Sep. 1994, pp. 1-8.
Fisher Bulletin 62.1:DT4000; Dec. 1995, pp. 1-12.
Foxboro/Eckardt SRD991 Production Information. Oct. 1995, pp. 1-2.
Hartmann & Braun, Intelligent Positioner TZID—Product Information, pp. 1-2.
Honeywell, Series EP2300 Electro-pneumatic positioner—Product Information, pp. 1-4.
Moore, ValvePAC Intelligent Valve Control—Product Information, pp. 1-5.
Neles-Jamesbury, The ND800 Valve Controller—Product Information, pp. 1-4.
Samson, Product Information, pp. 1-23.
Siemens, SIPART PS—Product Information, pp. 1-6.
Valtek, Logix/StarPac/StarPacII—Product Information, pp. 1-17.
Hart, IcoT—Product Information, pp. 1-17.
Worcester Controls, Pulsair—Product Information, pp. 1-25.
Yokogawa, ValveManager—Product Information, pp. 1-25.
The Authoritative Dictionary of IEEE Standards Terms 2000, Standards Information Network IEEE Press, 7th edition, p. 422.
European Patent Office, European Search Report for Application No. EP 03 40 0057 dated Feb. 4, 2005 (3 pages).
European Patent Office, European Search Report for Application No. 98 93 4660 dated Dec. 18, 2001 (4 pages).
WIPO, International Search Report for PCT/US98/14978 dated Jul. 20, 1998 (4 pages).
European Patent Office, European Search Report for Application No. EP 04 01 0177 dated Jul. 15, 2004 (3 pages).
European Patent Office, European Search Report for Application No. EP 04 01 0179 dated Apr. 8, 2005 (3 pages).
European Patent Office, European Search Report for Application No. EP 04 01 0178 dated Apr. 8, 2005 (3 pages).

* cited by examiner

Take the derivative

Solve the matrix for ω, the wavelet

Convolve the wavelet with a unit impulse (same as integrating)

Step Response Estimate

METHOD, SYSTEM AND STORAGE MEDIUM FOR PERFORMING ONLINE VALVE DIAGNOSTICS

CROSS REFERENCE TO RELATED APPLICATIONS

This application claims the benefit of U.S. provisional patent application Ser. No. 60/447,598, filed Feb. 14, 2003, the entire contents of which are incorporated herein by reference.

BACKGROUND OF THE INVENTION

Due to wear, environment, age, misapplication, or manufacturing flaws, control valves used in the process industries can perform improperly or fail. When they perform improperly, the result is often lower yield of the process. If they fail it will often shut the process down. In a large refinery or chemical plant or power plant either of these outcomes can be very expensive. Plant operators have been interested in finding ways to detect problems in valve operation before the problem manifests itself in ways that hinder plant production.

Some common problems that occur in valves are: seat wear or damage, stem damage, stem corrosion, stem wear, packing wear, linkage problems/failures, actuator spring problems/failures, and actuator diaphragm failures. Many of these problems cannot be definitively identified except by disassembling the valve and examining the parts. This is a common practice in valve diagnostics, but is an expensive solution.

In recent years, operators have begun to infer many of the common problems from tests that they can make with the valve fully assembled and still in the process line (although when the process is not running such as during a plant shutdown). Valve "testers" have been built which attach sensors to the valves and make measurements. The most common measurements include positioning error, accuracy, response time, overshoot, spring range, and friction. To perform these tests, sensors must be attached to the valve and the valve must be stoked through much of its range. This prevents these tests from being performed during plant operation.

The use of data acquisition systems to gather valve operation data has been available for some time but has not been widely used for specific valve diagnostic applications. More often data acquisition system data has been used to evaluate overall process operation and in process tuning. Valve setpoint and valve position have been available using SCADA systems or the control system for some time.

More recently, some of the data acquisition has been moved to the valve itself in the form of smart positioners. Instead of the valve setpoint and position being measured from analog signals sent back to the control room, these measurements are made at the valve and sent back to the control room in digital form using one of several standard communications protocols. Some of the vendors of the smart positioners have included diagnostic applications in the firmware of the positioners allowing the positioner to control the valve to perform some diagnostic tests. These tests include response time tests, step response tests, actuator signatures, and friction analysis. With a few exceptions, however, these tests must still be performed when the process is not running.

There has been considerable interest in tests that can be performed when the process is still running. At least one vendor has built some tests in the firmware of their positioner to gather diagnostic information. This vendor requires the use of a special version of the positioner to work with software in the control room to perform these tests and can provide information about valves during the normal operation or during operation where the valve is artificially moved but only a small amount which would be tolerated by the running operation.

Thus, there is a need in the art for a method and system for performing valve diagnostics during normal valve operation.

BRIEF SUMMARY OF THE INVENTION

Embodiments of the invention include methods and systems for performing online valve diagnostics. Valve characteristics such as step response, friction and spring range are determined while the valve is operating in a process. Valve information is obtained while the valve operates in response to a control signal controlling a process while the valve operates through a series of gradual movements. Valve characteristics are then determined from the valve information.

DETAILED DESCRIPTION

Figure 1:
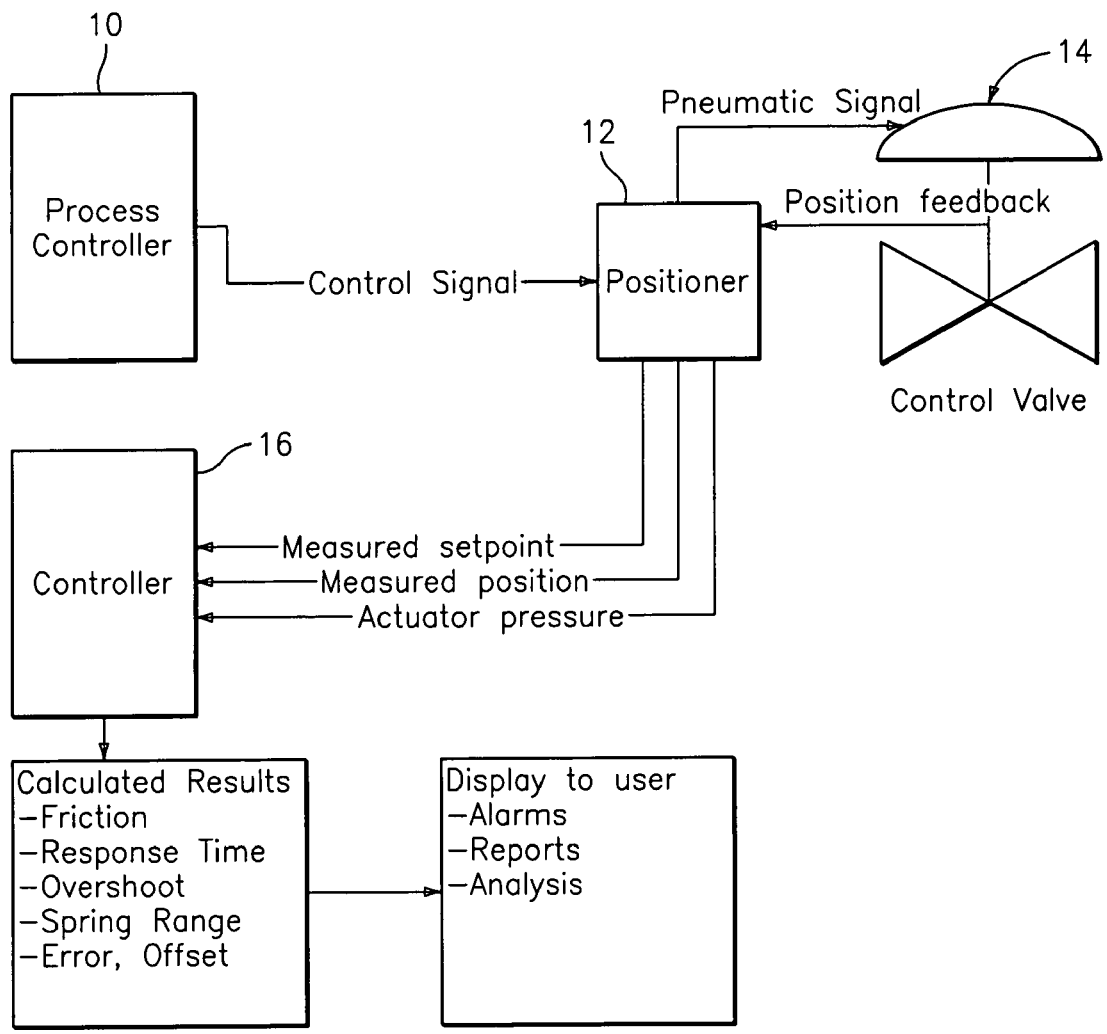
FIG. 1 depicts a system for performing valve diagnostics in an embodiment of the invention.

FIG. 1 depicts a system for performing valve diagnostics in an embodiment of the invention. A process controller 10 generates a control signal used to establish valve position during normal operation of a process. A positioner 12 interfaces with a valve 14 in response to the control signal from process controller 10. Positioner 12 interprets an electrical control signal and controls an actuator to position valve 14. A pneumatic signal is sent to valve 14 to position the valve in response to the control signal and a feedback signal is provided to positioner 12. The feedback signal indicates the position of valve 14. Positioner 12 relies on a position feedback measurement to adjust the actuator.

Positioner 12 provides valve information to controller 16. The valve information includes the measured setpoint, measured valve position and actuator pressure. Valve position indicates the actual position of the stem where 0% means fully closed and 100% means full open. Actuator pressure indicates the air pressure in the actuator that is needed to position the valve. The air pressure is opposed by the springs inside the actuator and by any force of the process fluid flow and by friction.

The controller 16 executes a routine for performing valve diagnostics. The controller 16 may be a microprocessor-based controller and the routine may be embodied in a computer program executed by the controller. The controller 16 may be implemented using a variety of technologies such as an application specific integrated circuit (ASIC), field programmable logic array (FPGA). Although, controller 16 is shown separate from valve 14, it is understood that controller 16 may be embedded within valve 14 as an integrated controller.

In operation, controller 16 monitors the valve information from valve 14 and performs valve diagnostics. During normal process operation, small changes in valve position occur due to changes in the setpoint sent to valve 14. The setpoint is the value of the signal converted to percent where 0% means closed and 100% means open. The valve 14 responds to the setpoint changes, moving the valve stem more open or closed. The controller 16 uses this data to compute characteristics such as error, offset, step response (including lag, response time (T86) and overshoot), oscillation, friction and spring range. As shown in FIG. 1, these calculated characteristics may be used to provide alarms, reports and/or analysis to users. Embodiments of the invention include deducing the step response, the friction, and the spring range.

With respect to lag, the controller estimates the overall lag between the setpoint changes and the position response to the changes. The lag is determined by computing the error between the setpoint and the lagged position. The computed lag is the lag that yields the least square error. The lag is used in computing the error and offset.

Error and offset are common measurements made in existing valve diagnostic systems. A straightforward computation of error as the difference between the setpoint and position, however, has the undesirable property of being significantly affected by the response time. In embodiments of the invention, controller 16 defines error as the difference between the setpoint and the lagged position, and this undesirable property is minimized. Controller 16 computes offset as the average of the error. Without the use of the lagged position, offset would have the same undesirable property.

Controller 16 also uses valve position spectral frequency to identify oscillation and limit cycling. As described in further detail herein, controller 16 uses standard Fourier techniques to obtain the spectrum.

A common diagnostic test is to change the setpoint abruptly and to see how the valve responds. Typically, the valve will not instantly follow the setpoint change but will take some time. The time it takes the valve to move 86% of the way from the starting point to the new setpoint it identified as T86 and is a common measurement. Once the valve reaches the new setpoint it may continue to move past the setpoint before returning to the correct position. This is called overshoot and is another common measurement.

During normal valve operation, the setpoint typically does not make any abrupt movements. Controller 16 may use two techniques to infer a step response from the gradual movements that occur during normal, in-process operation of valve 14. The first technique builds a model of valve response to setpoint changes. Using this model, controller 16 adjusts the model parameters until the prediction made by the model given the actual setpoint yields the minimum error between the prediction and the actual position. The model with these parameters can then be applied to a "step" in setpoint to create a graph of the step response in a form that those of ordinary skill in the art are familiar with. In one embodiment, the model used has two parameters, one that primarily affects the response time and one that primarily affects overshoot. The algorithm is described in further detail herein. From the result of this model, controller 16 predicts T86 and overshoot.

A second step response method involves the assumption that each small movement of the setpoint causes a series of responses (over time) from the valve 14. The valve position over time will be the sum of the responses from all of the individual changes in the setpoint. The time series response to each setpoint change is known as a wavelet. The wavelet that fits the data with least square error can be determined by solution of a series of linear equations. Applying the wavelet to a setpoint step will yield an estimate of the step response from which T86 and overshoot can be estimated. A detail derivation of the wavelet model is provided herein.

Friction is the force required to start the valve stem moving. For valves it is often measured in terms of the actuator pressure needed or as a percent of the actuator pressure needed. Friction is typically measured during an actuator signature by measuring the position hysteresis from increasing the actuator pressure and then decreasing the actuator pressure. The difference between the two resulting curves is proportional to the friction (stem friction plus actuator friction plus any deadband or other friction in the system).

When the valve in operation makes normal, small movements these movements move about small hysteresis loops. If the spring range of the valve is known, each of the samples of position versus pressure can be projected to the pressure axis using the slope of the spring range line. The spring range corresponds to the actuator pressures that cause the valve to be at the closed position and at the open position. These pressures are known as spring range because they are largely determined by the springs inside of the actuator.

This results in a "stretched normal" distribution which would be flat over a zone that represents the friction and tails off like a normal distribution outside of the flat area. The technique used in controller 16 projects the data to the pressure axis using the spring range slope and then finds the 90 percentile and 10 percentile values. The difference between these two values (of pressure) are an estimate of friction. This technique does not require any tracking of individual hysteresis loops and does not require any fitting of lines to the data and is thus very robust.

When the change in position throughout the sampled data is small, then errors in the assumed spring range will have almost no effect on the computed friction. When the position range is wider, it is possible to calculate the actual spring range to use.

Two additional methods of computing friction may be implemented. These methods do not require a pressure measurement and so can be used more broadly. The control system 10 typically makes very small corrections to the position. When these corrections are smaller than the friction (in percent of spring range) the valve will not actually respond to the changes. The control system 10 will then continue to change the setpoint until the valve finally responds. The change required in the setpoint until the valve finally moves is the friction percent. A first method uses the same modeling technique described above with respect to the step response. The model has a parameter that is the friction and the model computes no change in position until the integral of the changes to the setpoint in any direction exceeds the friction parameter, at which time the normal proportional-integral (PI) model is applied.

A second method computes the distribution of changes in the position versus the distribution of the changes in the setpoint. When a large peak exists in the position distribution that is at a higher position than the peaks in the setpoint, it represents a limit because of friction. Subtracting the setpoint change distribution from the position change distribution and finding the peak determines the friction.

Because of the hysteresis and because of inconsistencies in position versus pressure that occur during setpoint changes, fitting the position versus pressure data with a line to estimate spring range can be difficult. Embodiments of the invention implemented by controller 16 assume various spring ranges and project all of the sampled data to the pressure axis. The computed spring range is the spring range that minimizes the variance of the projected data. When the valve movement is more than 5% this method usually provides a good estimate of spring range.

Figure 2A:
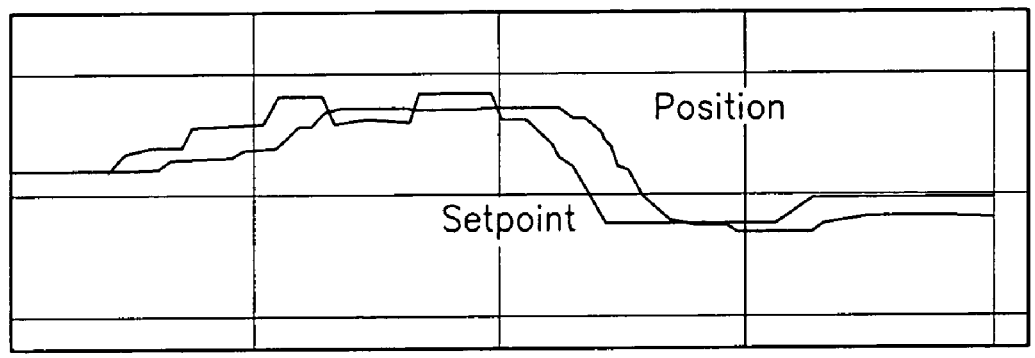
FIGS. 2A–2D depict processing to derive a step response model.

Additional detail concerning the processing performed by controller 16 will now be described. Embodiments of the invention employ processing analogous to wavelet processing used in seismic exploration. Let $s=s_0, s_1, s_2, s_3, \ldots$ be the input (setpoint) signal expressed in position percent units and $p=p_0, p_1, p_2, p_3, \ldots$ be the valve position. FIG. 2A illustrates the setpoint and position with respect to time. We assume that each change in the signal represents an impulse to the valve which responds with an extended output or wavelet $\omega=\omega_0, \omega_1, \omega_2, \ldots \omega_n \ldots$ . Expressed mathematically, $$\frac{dp}{dt} = \left(\frac{ds}{dt} \otimes \omega\right)$$

Integrating both sides we get $$p = \int \left(\frac{ds}{dt} \otimes \omega\right) dt$$

Figure 2B:
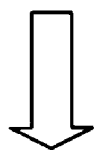
Figure 2B:
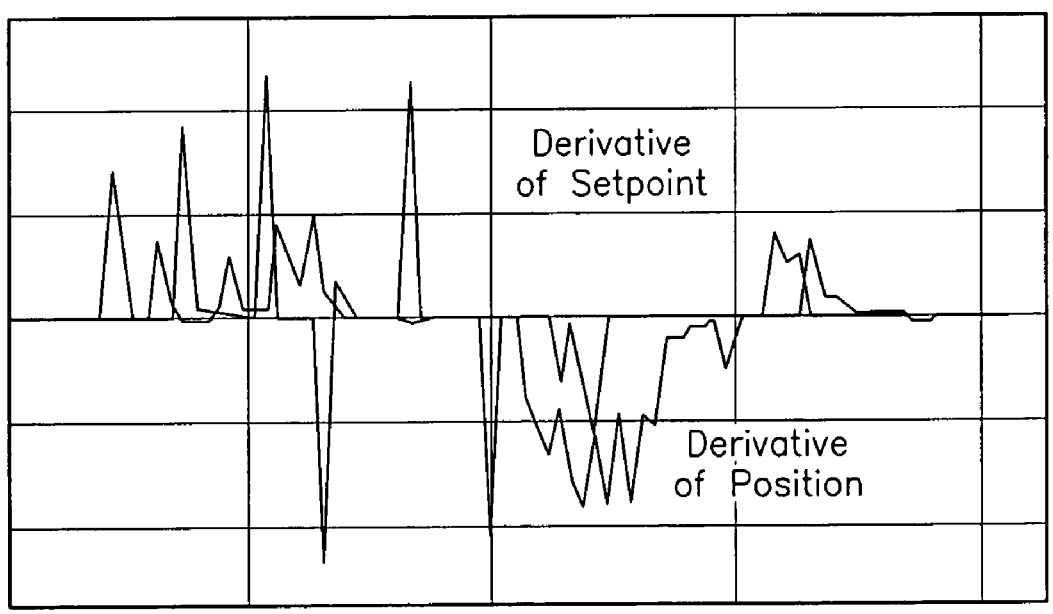

Let $i=i_1, i_2, i_3, \ldots$ be the time derivative of the (input) signal and $o=o_1, o_2, o_3, \ldots$ be the time derivative of the (output) position. FIG. 2B illustrates the derivative of setpoint and position. We can write out the convolution in the equation above as:

$$o_k=(i_k*\omega_0)+(i_{k-1}*\omega_1)+(i_{k-2}*\omega_s)+ \ldots (i_{k-n}*\omega_n)$$

This has the form of a linear equation with independent variables $i_k, i_{k-1}, \ldots$, dependent variable $o_k$, and coefficients $\omega_0, \omega_1, \ldots \omega_n$. Since we have many samples to work with, we can find a least squares estimate of the coefficients—i.e. the set of coefficients that gives the least error of estimating $o_k$ from the $i_k$ using the formula.

The least square formulas can be formed by multiplying the equation by each independent variable and summing to form a set of n+1 linear equations:

$$\Sigma(o_k \cdot i_k)=\omega_0\Sigma(i_k \cdot i_k)+\omega_1\Sigma(i_k \cdot i_{k-1})+ \ldots \omega_n\Sigma(i_k \cdot i_{k-n})$$

$$\Sigma(o_k \cdot i_{k-1})=\omega_0\Sigma(i_{k-1} \cdot i_k)+\omega_1\Sigma(i_{k-1} \cdot i_{k-1})+ \ldots \omega_n\Sigma(i_{k-1} \cdot i_{k-n})$$

$$\Sigma(o_k \cdot i_{k-2})=\omega_0\Sigma(i_{k-2} \cdot i_k)+\omega_1\Sigma(i_{k-2} \cdot i_{k-1})+ \ldots \omega_n\Sigma(i_{k-2} \cdot i_{k-n})$$

$$\Sigma(o_k \cdot i_{k-n})=\omega_0\Sigma(i_{k-n} \cdot i_k)+\omega_1\Sigma(i_{k-n} \cdot i_{k-1})+ \ldots \omega_n\Sigma(i_{k-n} \cdot i_{k-n})$$

If we use the symbols $C_{xy}(n)$ to be the cross product $\Sigma x_k \cdot y_{k-n}$ and $A_x(n)$ is the cross product (autocorrelation) $\Sigma x_k \cdot x_{k-n}$. These are the cross correlation and the autocorrelation functions. We can then write the equations as:

$$C_{oi}(0)=\omega_0 A_i(0)+\omega_1 A_i(1)+\omega_2 A_i(2)+ \ldots \omega_n A_i(n)$$

$$C_{oi}(1)=\omega_0 A_i(1)+\omega_1 A_i(0)+\omega_2 A_i(1)+ \ldots \omega_n A_i(n-1)$$

$$C_{oi}(2)=\omega_0 A_i(2)+\omega_1 A_i(1)+\omega_2 A_i(0)+ \ldots \omega_n A_i(n-2)$$

$$C_{oi}(3)=\omega_0 A_i(3)+\omega_1 A_i(2)+\omega_2 A_i(1)+ \ldots \omega_n A_i(n-3)$$

$$C_{oi}(n)=\omega_0 A_i(n)+\omega_1 A_i(n-1)++\omega_2 A_i(n-2) \ldots \omega_n A_i(0)$$

Written in matrix form:

$$\begin{bmatrix} A_i(0) & A_i(1) & \ldots & A_i(n) \\ A_i(1) & A_i(0) & & A_i(n-1) \\ \ldots & & & \\ A_i(n) & A_i(n-1) & \ldots & A_i(0) \end{bmatrix} \begin{bmatrix} \omega_0 \\ \varpi_1 \\ \ldots \\ \omega_n \end{bmatrix} = \begin{bmatrix} C_{oi}(0) \\ C_{oi}(1) \\ \ldots \\ C_{oi}(n) \end{bmatrix}$$

Figure 2C:
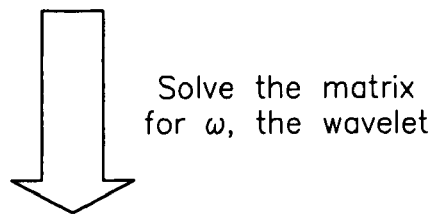
Figure 2C:
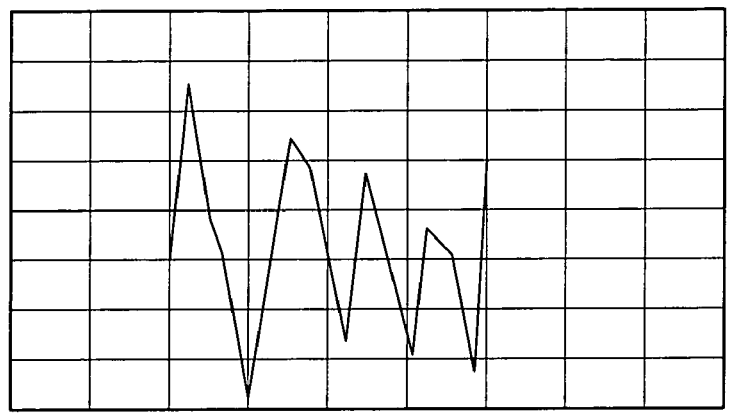

This can be solved by common matrix methods and results in a wavelet such as that shown in FIG. 2C. The controller 16 uses a Gauss Jordan elimination method with row swapping to solve for the wavelet.

Figure 2D:
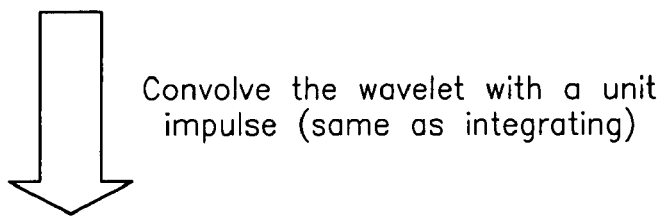
Figure 2D:

The derivative of a step input is an impulse. To calculate a step response model from the wavelet, the wavelet is convolved with a single impulse, which corresponds to the wavelet multiplied by a constant. This convolution is shown in FIG. 2D. The step response output (position) is the integral of the wavelet times the constant.

Another embodiment of the invention uses a proportional-integral (PI) model, although embodiments of the invention are not limited to this type of model. The model parameters are defined as follows.

Error$_i$=(Setpoint$_{i-1}$−Estimate$_{i-1}$)

Estimate$_i$=Estimate$_{i-1}$+Error$_i$*P+SumError*I+Offset

SumError=SumError+Error$_i$

Figure 3:
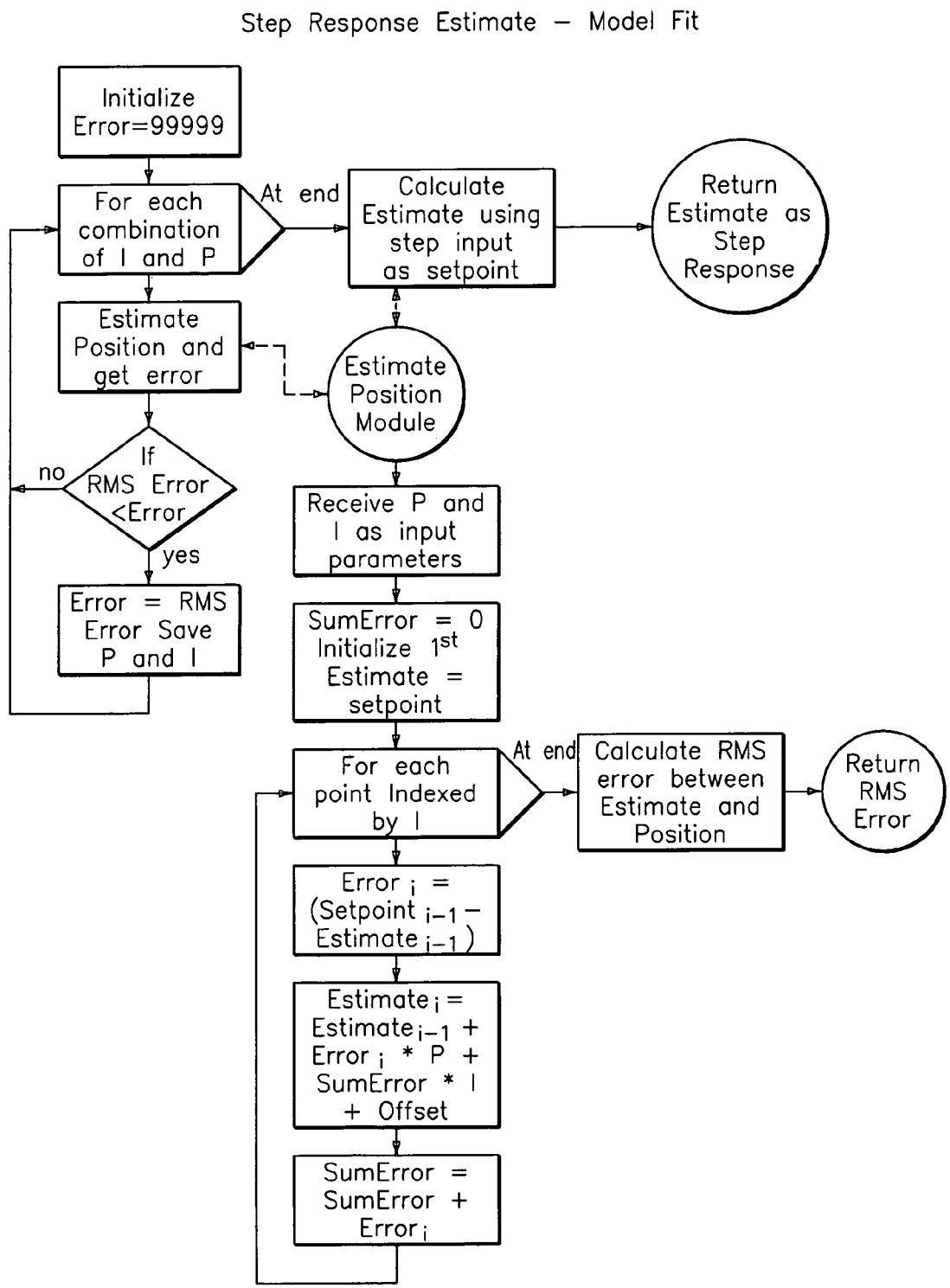
FIG. 3 is a flowchart of a process for determining model parameters.

The value of offset is computed as described above (the average of the error) and variable SumError is initialized to 0. Controller 16 determines P and I so that the square of the error between variables Estimate and Position is minimized. Two techniques may be used to determine P and I in order to minimize the square of the error. The first technique works recursively by for each parameter, finds a local minimum of the error by adjusting the parameters that follow it. This technique is depicted in FIG. 3 and is self explanatory.

A second technique works by creating a grid of N sections over the space of allowed values of each of the parameters. The error is calculated at each of the grid points. The grid section that contains the minimum error is selected and that grid is divided into N sections and the process is repeated until the lower limit of change is reached.

Figure 4A:
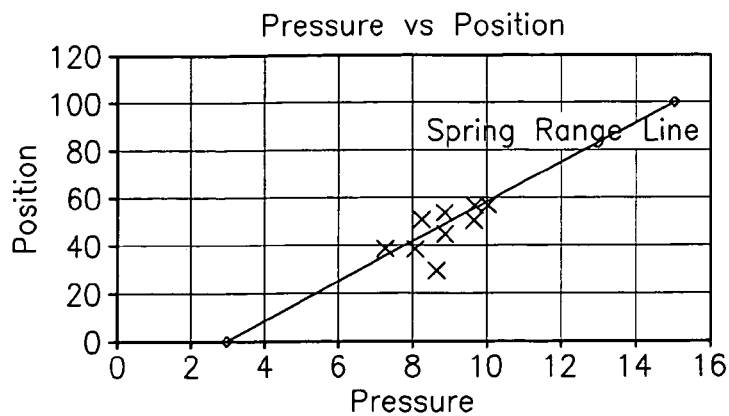
FIGS. 4A–4D depict processing to determine friction.

During normal operation of the valve, the setpoint will be changed slightly by the controller 10 to make fine adjustments. This will result in the positioner 12 making small adjustments in actuator pressure. But because of friction, the actuator pressure will increase or decrease some amount before the valve 14 actually moves. If pressure versus position is plotted, instead of following a line (representing the spring range), the points will follow a band around the spring range line, the width of the band representing the friction. FIG. 4A depicts a plot of pressure versus position.

Figure 4B:
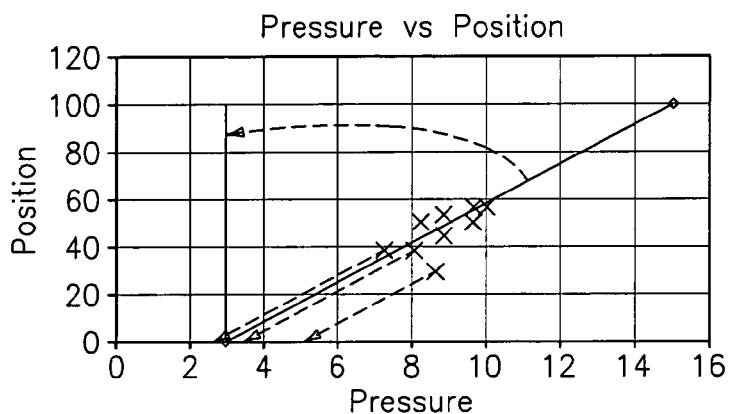
Figure 4C:
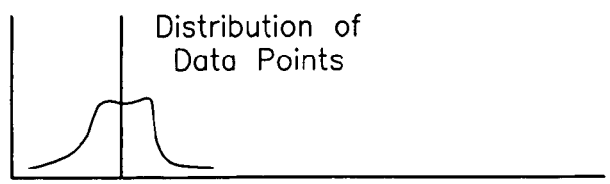
Figure 4D:
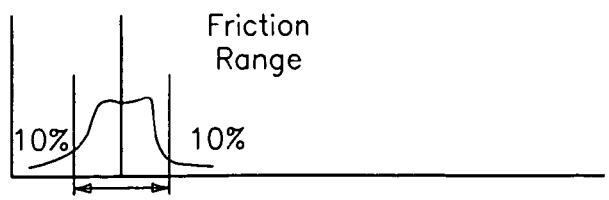

If the axis of the graph (pressure on the x axis, position on the y axis) is rotated so that the spring range line is vertical as shown in FIG. 4B, then, ignoring effects of process variations, the statistical distribution of the pressures will be approximately normal outside of the friction band and will be flat within the friction band as shown in FIG. 4C. The controller 16 estimates friction by finding the pressures within which 80% of the points lie after the graph has been rotated. The difference between the 90 percentile pressure and the 10 percentile pressure, shown in FIG. 4D, represents 2 times the friction. The reason for using the 10 percentile and 90 percentile (or other values such as 20 and 80) is that some of the valve movements, if rapid, will cause a lag between the pressure change and valve movement. This will cause the pressure-position point that was sampled to be outside of where it would normally be. Excluding the outer 20% of the points yields a better estimate of friction since the points left are probably not ones that were affected by the sudden movements.

Figure 5A:
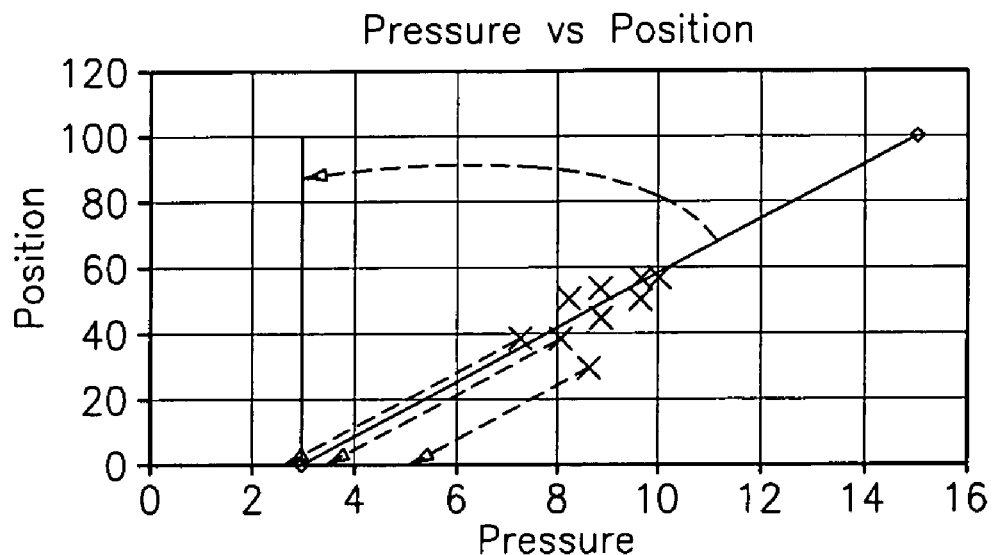
FIGS. 5A–5B depict processing to determine spring range.
Figure 5B:
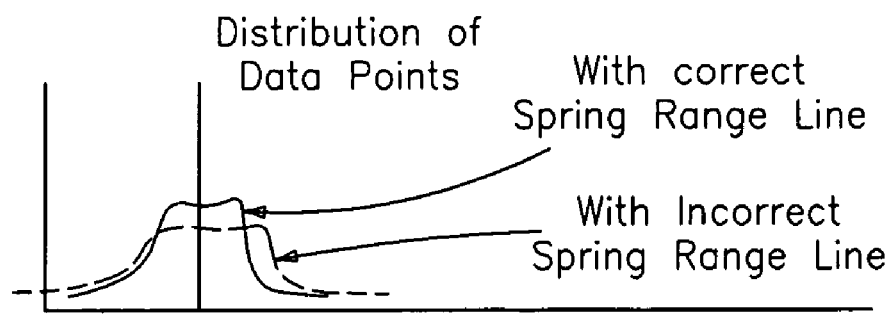

Controller 16 also determines the spring range for valve 14. As described above, to perform the friction calculation, the axis of the pressure versus position graph is rotated so that the spring range line is vertical. This provides an approximate spring range that is used for friction calculation. It is possible, however, to calculate the spring range by rotating the axis if enough data is present. FIG. 5A depicts the axis of the pressure versus position graph being rotated. To compute the spring range, controller 16 searches for a rotation value that makes the variance of the data points a minimum. FIG. 5B depicts the data distribution for two different rotations of the axis, one having a lower variance. The average of the resulting pressure values is the lower spring range and the amount of rotation determines the slope (and thus the upper spring range).

Figure 6:
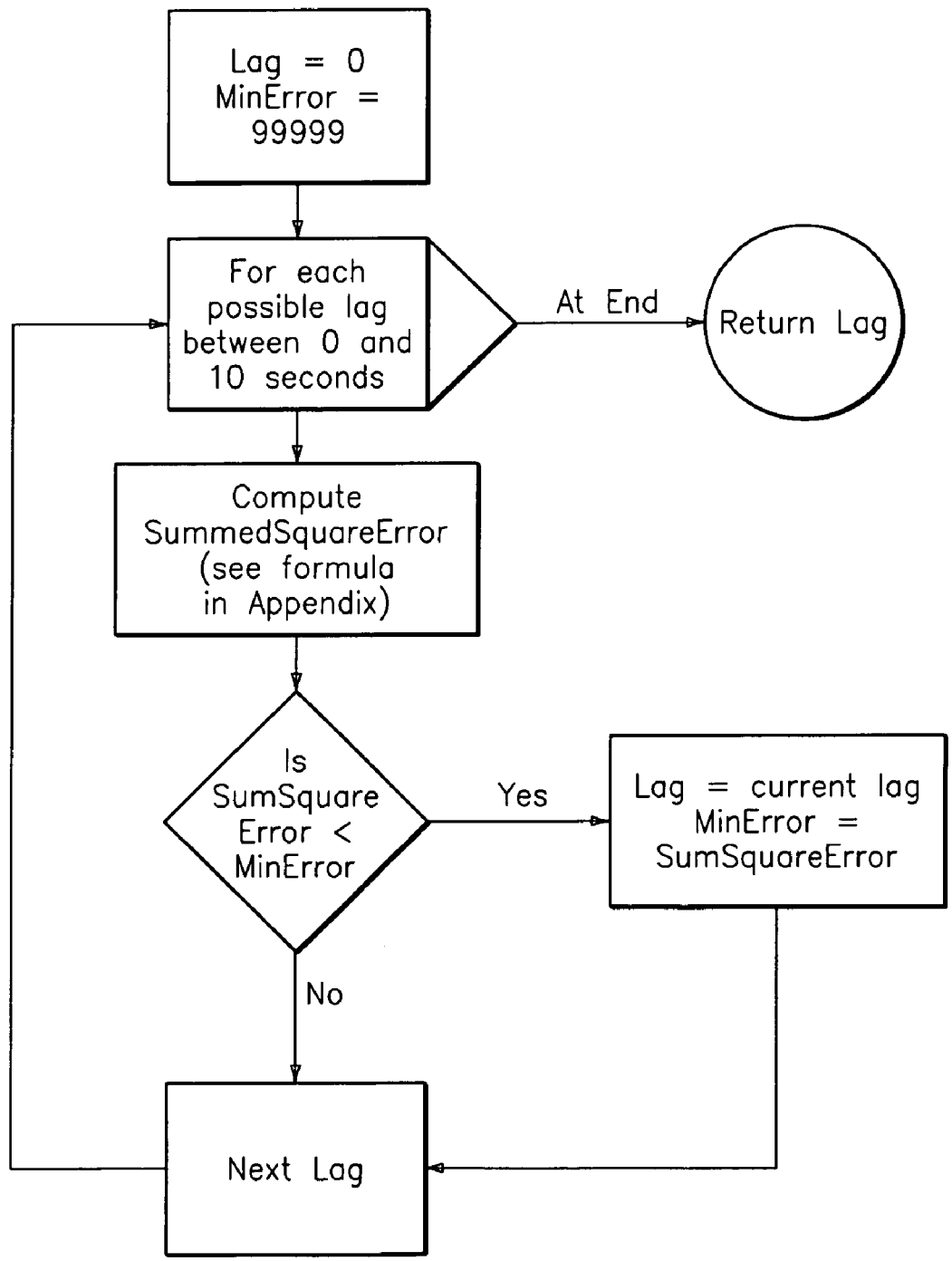
FIG. 6 depicts a process for determining a lag generating a minimum error.

The lag calculation is determined by finding the lag that results in the minimum summed square error from the setpoint. The values $$\text{Error}_i = (\text{Setpoint}_i - \text{Position}_{i+lag})^2$$

$$\text{SummedSquareError} = \Sigma \text{Error}$$

are computed by controller 16 for each lag within the accepted range. The lag for which SummedSquareError is minimum is the computed lag. FIG. 6 depicts a process for determining the lag that generates the minimum sum of squared error.

With respect to offset and error, controller 16 computes error after the lag has been determined as follows.

$$\text{Error} = ((\Sigma((\text{Setpoint}_i - \text{Position}_{i+lag})^2))/\text{NumberOfPoints})^{1/2}$$

The offset is computed as the average of the raw error as follows.

$$\text{Offset} = (\Sigma(\text{Setpoint}_i - \text{Position}_{i+lag}))/\text{NumberOfPoints}$$

Embodiments of the invention provide for taking data with the process running, but not intervening at all by changing what the process controller does. In other words, controller 16 acts as a passive listener. If the plant engineer intervenes and causes small changes in the process, controller 16 produces better information, however, it is not required that the engineer make any changes. In fact, tests performed by controller 16 are made automatically on a scheduled basis without the engineer even being aware that the tests are being made.

While the invention has been described with reference to exemplary embodiments, it will be understood by those skilled in the art that various changes may be made and equivalents may be substituted for elements thereof without departing from the essential scope thereof. Therefore, it is intended that the invention not be limited to the particular embodiments disclosed for carrying out the invention, but that the invention will include all embodiments falling within the scope of the appended claims.

What is claimed is:

1. A method of performing online valve diagnostics for a valve operating in a plant process, the method comprising:
   obtaining valve information while said valve operates in response to a plurality of setpoints determined for controlling said plant process, said valve operating through a series of gradual movements;
   said valve information including at least two of setpoint data, position data and pressure data;
   deriving at least one of step response, friction and spring range for said valve based on said valve information.

2. The method of claim 1 further comprising:
   deriving a model of valve response to setpoint changes in response to said valve information;
   adjusting said model in response to error between predictions generated by said model and actual position information; and
   applying a step input to said model to generate a step response.

3. The method of claim 2 wherein:
   adjusting said model includes adjusting a first parameter affecting response time.

4. The method of claim 3 wherein:
   adjusting said model includes adjusting a second parameter affecting overshoot.

5. The method of claim 2 wherein:
   said deriving said model includes taking a derivative of a setpoint data and taking a derivative of position data;
   solving for a set of coefficients that minimizes the error estimating said derivative of position data from said derivative of input data to define a wavelet;
   said applying said step input to said model includes integrating said wavelet; and
   deriving response time and overshoot from said step response.

6. The method of claim 2 wherein:
   said deriving said model includes obtaining plurality of wavelets in response to setpoint changes;
   said adjusting includes selecting one of said wavelets with minimal error;
   deriving a step response by applying said wavelet to an impulse; and
   deriving response time and overshoot from said step response.

7. The method of claim 1 further comprising:
   deriving a distribution of said position data by transforming said pressure data and said position data in response to a spring range of said valve;
   determining friction of said valve in response to said distribution.

8. The method of claim 7 wherein:
   said determining friction includes determining a difference between an upper percentile and a lower percentile of said distribution.

9. The method of claim 8 wherein:
   said upper percentile is 90 percent and said lower percentile is 10 percent.

10. The method of claim 7 wherein:
    said deriving said distribution includes projecting position data to a pressure axis along a slope corresponding to said spring range.

11. The method of claim 1 further comprising:
    deriving a plurality of distributions of said position data in response to a plurality of spring ranges of said valve;

selecting one of said spring ranges in response to variance of said plurality of distributions.

12. A system for deriving valve characteristics of a valve operating in a plant process, the system comprising:
- a process controller generating a plurality of setpoints determined for controlling said plant process, said plurality of setpoints operating said valve through a series of gradual movements;
- a positioner receiving said plurality of setpoints and generating a signal for positioning said valve;
- a controller receiving valve information from said positioner while it is operating based on the setpoints, said valve information including at least two of setpoint data, position data and pressure data;
- said controller deriving at least one of step response, friction and spring range for said valve based on said valve information.

13. A storage medium encoded with machine-readable computer program code for deriving valve characteristics of a valve operating in a plant process, the storage medium including instructions for causing a controller to implement a method comprising:
- obtaining valve information while said valve operates in response to a plurality of setpoints determined for controlling said plant process, said valve operating through a series of gradual movements;
- said valve information including at least two of setpoint data, position data and pressure data;
- deriving at least one of step response, friction and spring range for said valve based on said valve information.

* * * * *